Dec. 25, 1934.   K. H. HUBBARD   1,985,829
REGULATOR
Filed Nov. 7, 1930

INVENTOR:
Karl H. Hubbard
BY
Alfred Burger
ATTORNEY

Patented Dec. 25, 1934

1,985,829

UNITED STATES PATENT OFFICE 1,985,829

REGULATOR

Karl H. Hubbard, Rochester, N. Y., assignor to Taylor Instrument Companies, Rochester, N. Y., a corporation of New York Application November 7, 1930, Serial No. 494,179

20 Claims. (Cl. 236—82)

This invention relates to air-operated regulators.

Air is extensively used as an actuating medium for the operation of valves particularly in connection with the control of temperature and pressure conditions. In most regulators of the type involved, a primary element such as a Bourdon coil or a pressure-responsive diaphragm is capable of supplying only very little energy, but it is made to control the output of a valve or valves regulating a stream or streams of compressed air or other pressure fluid, which output is sufficiently large so that various motor devices may be actuated by it.

It is the general object of the invention to provide a type of air-operated regulator of great stability and smooth performance.

Figure 1:
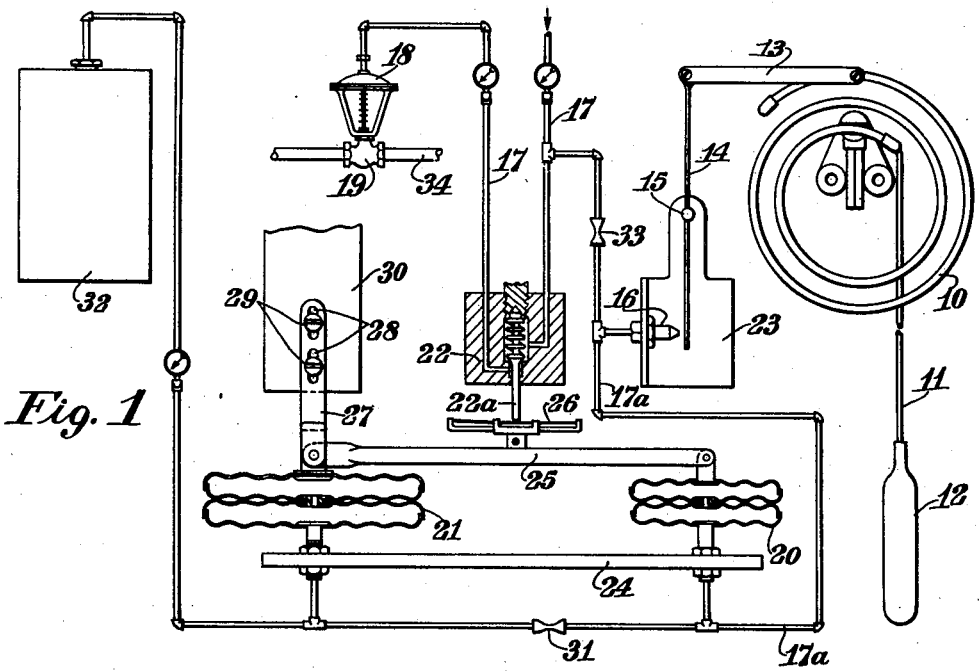
Figure 2:
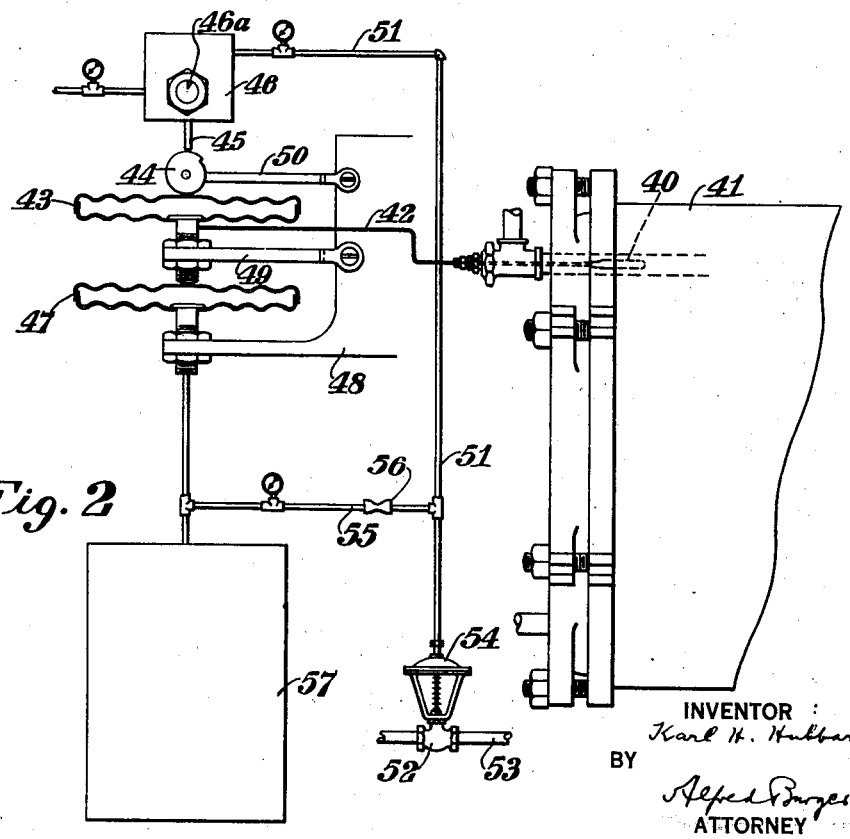

For a full understanding of the invention, reference is made to the accompanying drawing wherein Fig. 1 is a diagrammatic representation of an arrangement embodying the invention; and Fig. 2 is a similar view of another arrangement to which the invention is applied.

In Fig. 1, 10 is a Bourdon tube connected by means of a capillary 11 with a bulb 12. The free end of the Bourdon tube is connected by means of a link 13 with a lever 14 supported for angular movement about a pivot 15. The lower end of the lever 14 acts as a baffle for the control of the orifice of a jet 16 connected to a pressure fluid conduit 17 which primarily furnishes the pressure for the operation of the diaphragm top 18 of valve 19 and also furnishes the fluid pressure for the operation of capsular diaphragms 20 and 21 which in turn control the operation of valve 22 by which the pressure of pressure fluid at the diaphragm top 18 is regulated. The conduit 17 is connected with the diaphragm 20 and 21 by means of a conduit 17a to which the jet 16 is connected. The jet 16 and the baffle 14 may be mounted on a common support 23 as shown. The diaphragms 20 and 21 are mounted on a support 24 and the upper sides of the diaphragms are pivotally interconnected by a bar 25, which in turn through compensating device 26 acts upon the stem 22a of the valve 22.

The diaphragm 21 carries a bar 27 provided with slots 28 cooperating with screws or studs 29 on a support 30 to limit the vertical motion of the diaphragm 21.

An orifice 31 is provided in the conduit 17a between the diaphragms 20 and 21 and a reservoir 32 is in fluid connection with the diaphragm 21. An orifice 33 in the conduit 17a serves to limit the air flow so that the baffle will control the pressure on diaphragms 20 and 21.

The operation is as follows:

The bulb 12 and the Bourdon tube 10 represent a system sensitive to conditions to be controlled, whether they be temperature conditions as suggested or other conditions. As the temperature at the bulb undergoes a change, the lever 14 moves toward or away from the orifice of the jet 16 and thereby decreases or increases the opening of the orifice, as the case may be. The fluid pressure in the conduit 17a below the orifice 33 thus increases or decreases in the same proportion as the opening of the jet 16 is decreased or increased, respectively. The pressure in the conduit 17a is consequently varied as the result of and in proportion to the changes in the conditions at the bulb 12, i. e. the conditions to be controlled.

The diaphragms 20 and 21, which are actuated by the pressure in the conduit 17a, expand and contract likewise as a function of the changes in the conditions at the bulb 12, and through the bar 25 and compensator 26 they operate the valve 22 and vary the pressure at the outlet side thereof and at the diaphragm top in accordance with the variations in the conditions at bulb 12.

The invention comprises the use of two diaphragms, one of which (diaphragm 20) is of relatively small sensitivity as compared to the diaphragm 21, i. e. the expansive movement of the diaphragm 21 is considerably greater than that of the diaphragm 20 for equal pressure changes. On the other hand, the action of the diaphragm 21 is delayed relatively to the diaphragm 20, by the use of orifice 31 and reservoir 32. The greater capacity of the reservoir and the smaller the orifice 31, the longer it will take for the diaphragm 21 to reach its final position of balance. While the diaphragm 20 immediately acts in response to a change in the conditions at the bulb 12 and initiates the regulating action upon valve 22 for the setting of the valve 19 which controls the steam supply pipe 34 or other means for regulating the temperature at the bulb or, in general, for regulating conditions to be controlled, diaphragm 21 supplements or continues the initial regulating movement of diaphragm 20 by a very gradual movement of considerably greater sensitivity than that produced by diaphragm 20. The combined effect of the two diaphragms, therefore, is in substance a regulator device of great sensitivity, but free from the disadvantages, principally hunting, usually associated with highly sensitive regulators.

The diaphragm may be constructed to have any desired degree of sensitiveness possible within the relatively wide mechanical limits and the reservoir 32 may have any desired capacity. In the drawing the size of the reservoir is shown relatively small for lack of space, but it is understood that its size is dictated solely by the gradient of motion desired for the diaphragm 21. Also the size of the orifice is purely a matter of choice.

While I have shown only two diaphragms and while for most practical cases two diaphragms are sufficient to produce the desired result, there may be more than two diaphragms all of different sensitivity and different gradients of motion to obtain any desired composite motion of the valve 22.

I find it advantageous to limit the range of motion of the diaphragm 21 by means of the cooperation of slots 28 and studs 29. The compensator 26 does not form part of the invention. It serves the purpose to compensate for changes of pressure line 17 which, if uncorrected, would interfere with the proper functioning of the device.

The operative relation of the two diaphragms 20 and 21 may also be altered in many other ways. Thus the length of the lever 25 and the point thereof at which it acts upon the valve stem 22a, may be varied within wide limits. In fact, the superposition of the two diaphragm movements upon the valve stem so as to have an additive effect, may be accomplished in many different ways.

In Fig. 2 of the drawing, the temperature bulb 40 is shown applied to a milk heater 41. The bulb is connected by means of a capillary 42 to a diaphragm 43 which through an adjustable cam 44 acts upon the stem 45 of valve 46. The arrangement thus far described represents the usual form of device of low sensitivity. To obtain a device of high sensitivity, I apply a second diaphragm 47 of relatively high sensitivity, preferably disposed in vertical alignment with the diaphragm 43 and supporting the latter. The diaphragm 47 is mounted on a support 48 and the diaphragm 43 and the cam 44 are held in their assigned positions by means of arms 49 and 50, respectively, pivoted on the support 48, but otherwise supported by the upper surface of the diaphragm 47.

The valve 46 controls a compressed air conduit 51 for the operation of the valve 52 in steam line 53 by which the temperature in the milk heater is controlled. The purpose of the valve 46 is to vary the air pressure at the diaphragm top 54 in proportion to the changes in the temperature conditions of the heater.

The diaphragm 47 is in fluid pressure connection with the conduit 51 through a branch line 55. Since the pressure in line 51 originally varies as a function of the stem movement caused by the diaphragm 43 and the expansion or contraction of the diaphragm 43, in turn, is a function of changes in the conditions at the bulb 40, the air pressure in the line 51 varies as a function of the change in the conditions at bulb 40 and the expansion or contraction of the diaphragm 47 which is due to the pressure changes in line 51, is a function of both, the expansion or contraction of diaphragm 43 and the changes in the conditions at bulb 40. The expansive or contractive movement of diaphragm 47 is directly superimposed upon the expansive or contractive movement of diaphragm 43 so that the movement of the valve stem is the sum of the expansive or contractive movements of the two diaphragms.

As soon as a slight change of pressure is induced in conduit 51 due to the primary action of diaphragm 43, this slight change reacts upon diaphragm 47 which effects a movement of the valve stem whereby the pressure at the outlet side of the valve is increased and this increase again reacts upon the diaphragm 47 and so on until finally a balance is established between the pressure in the conduit 51 and the counter-pressure of the diaphragm. A variable leak in the system, usually at the valve 46, as for instance the leak 46a may be used to accurately determine the final pressure limit or the pressure at which equilibrium is attained.

An orifice 56 and a reservoir 57 are again resorted to for the purpose of giving to the diaphragm 47 the desired gradient of motion.

In both arrangements means have been provided for delaying the action of the more sensitive diaphragm or rather for softening its gradient of action. It is understood that, although I consider reservoirs and orifices as best adapted for my purposes, any other means or contrivance operative to introduce a time lag or a lag in the effect of the pressure medium upon the diaphragm is satisfactory.

I claim:

1. In apparatus of the character described, a pressure fluid conduit, a valve controlling the conduit, a plurality of means responsive to conditions to be controlled for jointly actuating the valve to vary the pressure in the conduit in proportion to a change in the said conditions, one of said means having a relatively small but immediate effect upon the valve and another of said means being responsive to said pressure variation and having a relatively large effect upon the valve, and means for delaying the action of said last-mentioned means.

2. In apparatus of the character described, a pressure fluid conduit, and a valve controlling the conduit, a plurality of means responsive to conditions to be controlled for jointly actuating the valve in the same direction to vary the pressure in the conduit in proportion to a change in the said conditions, one of said means being responsive to said pressure variation and including means for delaying the action thereof relatively to the other means.

3. In apparatus of the character described, a pressure fluid conduit, a valve controlling the conduit, and a plurality of means sensitive to conditions to be controlled for jointly actuating the valve in the same direction to vary the pressure in the conduit in proportion to a change in the said conditions, one of said means being more sensitive than the other and including means for delaying its action relatively to the said other means.

4. In apparatus of the character described, the combination with means sensitive to conditions to be controlled, a pressure fluid conduit and a valve controlling the conduit, of means for jointly operating the valve in accordance with the variations in said conditions, including a plurality of pressure-responsive means of different sensitivity, and means for delaying the action of the more sensitive means relative to the less sensitive means.

5. In apparatus of the character described, the combination with means sensitive to conditions to be controlled, including a pressure-sensitive device, a pressure fluid conduit, a valve controlling the conduit and means for translating the motion of the pressure-responsive device to move the valve, of a second pressure sensitive device of materially higher sensitivity than said first pressure-sensitive device, responsive to changes in said conditions, and means for translating the motion of the second pressure-sensitive device to impart movement to the valve in addition to the movement due to the action of the first pressure-sensitive device.

6. In apparatus of the character described, the combination with means sensitive to conditions to be controlled, including a pressure-sensitive device, a pressure fluid conduit, a valve controlling the conduit and means for translating the motion of the pressure-responsive device to move the valve, of a second pressure sensitive device of materially higher sensitivity than said first pressure-sensitive device, responsive to changes in said conditions, means for translating the motion of the second pressure-sensitive device to impart movement to the valve in addition to the movement due to the action of the first pressure-sensitive device, and means for delaying the action of the second pressure-sensitive device relatively to the first pressure-sensitive device.

7. In apparatus of the character described, the combination of a pressure-fluid conduit, a valve controlling the same, two capsular diaphragms of materially different sensitivities operating in the same direction in response to fluid pressure, means for impressing upon the diaphragms fluid pressures variable as functions of changes in conditions to be controlled, and means for superimposing the motions of the diaphragms upon the stem of the valve.

8. In apparatus of the character described, the combination of a pressure fluid conduit, a valve controlling the same, two capsular diaphragms of materially different sensitivities, means for impressing upon the diaphragms fluid pressures, variable as functions of changes in conditions to be controlled, means for superimposing the motions of the diaphragms upon the stem of the valve, and means for delaying the action of the more sensitive diaphragms relatively to the less sensitive diaphragm.

9. In apparatus of the character described, a valve, a sensitive diaphragm and a diaphragm of relatively low sensitivity cooperating to actuate said valve, a conduit for connecting a source of fluid pressure to said diaphragms, a nozzle communicating with said conduit, means sensitive to conditions to be controlled for varying the escape of fluid pressure through said nozzle whereby the operation of said diaphragms may be regulated.

10. In apparatus of the character described, a valve, a sensitive diaphragm and a diaphragm of relatively low sensitivity cooperating to actuate said valve, a conduit for connecting a source of fluid pressure to said diaphragm, a nozzle communicating with said conduit, means sensitive to conditions to be controlled for varying the escape of fluid pressure through said nozzle, and means for impeding the flow of fluid pressure in said second conduit between said fluid pressure source and said nozzle.

11. In apparatus of the character described, a valve, a sensitive diaphragm and a diaphragm of relatively low sensitivity cooperating to actuate said valve, a conduit connected to a fluid pressure source and having a main portion and branches leading to said diaphragms, means sensitive to conditions to be controlled for varying the fluid pressure in the main portion of said conduit whereby said diaphragms are actuated, and means for impeding the flow of pressure fluid in the branch conduit leading to said sensitive diaphragm.

12. In apparatus of the character described, a valve, a fast-acting diaphragm of low sensitivity and a sensitive slow-acting diaphragm, a lever for operating said valve, said lever being mounted for actuation at one end by said sensitive diaphragm and at its other end by said low sensitivity diaphragm, a conduit leading from said source of fluid pressure to said diaphragms, and means sensitive to conditions to be controlled for varying the pressure in said conduit whereby said diaphragms are actuated.

13. In apparatus of the character described, a pressure fluid conduit, primary means sensitive to a change in the condition to be controlled for acting upon the conduit to effect a substantially immediate primary variation in the pressure therein in proportion to a change in the condition, and secondary means including at least a part of said primary means, said secondary means being responsive to said primary variation in pressure for effecting a secondary variation in the pressure in the conduit in addition to the primary variation, in the same direction therewith and at a rate in proportion thereto, and means for delaying the response to said secondary means.

14. In apparatus of the character described, a pressure fluid conduit, primary means sensitive to a change in the condition to be controlled for acting upon the conduit to effect a substantially immediate and relatively small primary variation in the pressure therein in proportion to a change in said condition, and secondary means including at least a part of said primary means, said secondary means being responsive to said pressure variation for effecting a secondary relatively large variation in the pressure in the conduit in addition to the primary variation and at a rate in proportion thereto, and means for delaying said secondary variation.

15. In apparatus of the character described, a pressure fluid conduit, primary means sensitive to conditions to be controlled for acting upon the conduit to effect a substantially immediate primary variation in the pressure therein in proportion to a change in said conditions, and secondary means including at least a part of the primary means, said secondary means being responsive to said primary pressure variation for effecting a secondary variation in the pressure in the conduit in addition to the primary variation and at a rate in proportion thereto, said primary and said secondary pressure variations being of unequal magnitude, and means for delaying the action of said secondary means.

16. In apparatus of the character described, a valve, a pressure fluid-actuated motor for operating said valve, a pressure fluid conduit communicating with said motor, a second valve controlling the flow of pressure fluid through said conduit to said motor, primary means sensitive to a change in the condition to be controlled for operating said second valve to effect a substantially immediate primary variation in the pressure in said conduit proportionally to a change in the condition, and secondary means including at least a part of the primary means, said secondary means being responsive to the primary variation in pressure for effecting a secondary variation in the pressure in the conduit in addition to the primary variation in the same direction therewith and at a rate in proportion thereto, and means for introducing a time lag in said secondary variation.

17. The method of operating a pressure fluid actuated device to control a condition to be regulated which comprises utilizing a primary response, the amount of which is a function of the variation of said condition, to vary the pressure of a fluid applied to said device, and utilizing a second delayed response to further vary in the same sense the pressure of the fluid applied to said device, said delayed response being produced by said original pressure variation.

18. The method of operating a pressure fluid actuated device to control a condition to be regulated which comprises utilizing a primary response, the amount of which is a function of the variation in said condition, to vary the pressure of a fluid applied to said device, and utilizing a second delayed response produced by the pressure variation to further vary in the same sense the pressure of the fluid applied to said device, the rate of said delayed response being a function of the amount of said original pressure variation.

19. The method of operating a pressure fluid actuated device to control a condition to be regulated which comprises utilizing a primary response of low sensitivity, the amount of which is a function of the variation in said condition, to vary the pressure of a fluid applied to said device, and utilizing a second delayed response of high sensitivity to further vary in the same sense the pressure of the fluid applied to said device, said delayed response being produced by said original pressure variation.

20. The method of operating a pressure fluid actuated device to control a condition to be regulated which comprises utilizing a primary low sensitivity response in a certain operating range to vary the pressure of the fluid applied to said device, and then utilizing a second delayed response of higher sensitivity than the first response to further vary in the same sense the pressure of the fluid supplied to said regulating device, said second response being produced by said first-mentioned pressure variation.

KARL H. HUBBARD.

CERTIFICATE OF CORRECTION.

Patent No. 1,985,829.  December 25, 1934.

KARL H. HUBBARD.

It is hereby certified that error appears in the printed specification of the above numbered patent requiring correction as follows: Page 3, second column, line 31, claim 13, for the word "to" read of; and that the said Letters Patent should be read with this correction therein that the same may conform to the record of the case in the Patent Office.

Signed and sealed this 5th day of February, A. D. 1935.

Leslie Frazer (Seal)  Acting Commissioner of Patents.